| United States Patent [19] | [11] Patent Number: 4,742,040 |
| Ohsaki et al. | [45] Date of Patent: May 3, 1988 |

[54] PROCESS FOR MANUFACTURING A CARBON MOLECULAR SIEVE

[75] Inventors: Takushi Ohsaki; Susumu Abe, both of Bizen, Japan

[73] Assignee: Kuraray Chemical Co., Ltd., Bizen, Japan

[21] Appl. No.: 8,327

[22] Filed: Jan. 29, 1987

[30] Foreign Application Priority Data

Jan. 29, 1986 [JP] Japan ................... 61-17487

[51] Int. Cl.⁴ ................. B01J 20/20; C01B 31/08
[52] U.S. Cl. ..................... 502/426; 55/68; 264/29.5; 423/461; 502/417; 502/432; 502/437
[58] Field of Search ........... 502/437, 432, 429, 417, 502/416, 426; 264/29.1, 29.3, 29.5; 423/460, 461

[56] References Cited

U.S. PATENT DOCUMENTS 4,458,022  7/1984  Ohsaki et al. ............... 502/437

FOREIGN PATENT DOCUMENTS 130226  10/1981  Japan ................... 502/416

*Primary Examiner*—Paul E. Konopka
*Attorney, Agent, or Firm*—Oblon, Fisher, Spivak, McClelland & Maier

[57] ABSTRACT

A process for manufacturing a carbon molecular sieve having both increased gas adsorption capacity and selectivity, which entails:

(a) adding coal tar, coal tar pitch, or a combination thereof to powdered coconut shell charcoal as a binder;

(b) pelletizing the mixture and carbonizing the same at about 600°–900°;

(c) immersing the pellets in mineral acid solution, thereby sustantially removing soluble ingredients containing alkaline metal compounds therefrom;

(d) drying the immersed pellets;

(e) adding to the dried pellets a fraction of cresote which is distilled at a temperature of 140° to 260° C., in an amount sufficient to increase both said gas adsorption capacity and selectivity;

(f) heating the pellets to about 600°–900° C., for about 10–60 minutes; and (g) cooling the pellets in an inert gas.

9 Claims, No Drawings

PROCESS FOR MANUFACTURING A CARBON MOLECULAR SIEVE

BACKGROUND OF THE INVENTION

The singular character of the surface of carbon derived from its microporous structure, are well known, among them, character of molecular sieve is worth noticing which the selective adsorptive capacity changes depending on the size of the micropore of the surface. The pressure swing adsorption process is one of the most important uses of a carbon molecular sieve which is adapted to separation of gaseous mixture by making use of the difference of the character of selective adsorption.

In Japanese Patent Publication No. 38-25969, wherein, a Principle and Process of pressure swing adsorption and one of its application example—separation of nitrogen and oxygen gas from air with activated carbon—are disclosed. The surface of carbonaceous material naturally has more or less the property of a molecular sieve, derived from its microporous structure. In 1948, P. H. Emmett first prepared a carbon molecular sieve by dry distillation of polyvinylidenchloride resin. (P. H. Emmett: Chem. Rev. vol. 43, P. 69).

Usually, the diameter of micropores on the surface of carbon prepared by conventional processes is usually greater than 10-20 Å, so micropores of this size are too large to separate molecules of small size, for example separation of nitrogen and oxygen gas from air, namely the property of molecular sieve is inadequate. Several processes of manufacturing carbon molecular sieve which is applicable to separation of oxygen and nitrogen gas from air, have been disclosed, wherein micropores are partially packed with fine carbon particles and their size become narrow, thus the property of a molecular sieve is increased. For example, such a process is disclosed in Japanese Patent Publication No. 49-37036, wherein small amounts of prepolymer of phenol resin or furan resin are added to activated carbon, polymerized, carbonized by heating at 400°-1,000° C., thus micropore on activated carbon is partially packed with carbonaceous material and given the property of molecular sieving. In Japanese Patent Publication No. 52-18675, coke of which volatile material content is less than 5%, is heated to 600°-900° C. in a furnace, then hydrocarbon vapour, such as benzene, toluene and producer gas, is introduced therein, soot generated by decomposition of hydrocarbon partially packs the micropores of coke, thus a molecular sieve made of coke is formed. In this process, decomposition of hydrocarbon vapour in the furnace is considered to be an indispensable requirement. In Japanese Patent Application Laid Open No. 49-106982, a method to narrow the size of micropores of coke is described, wherein an organic compound in vapour or in solution is adsorbed onto the surface of coke, thus, the micropore is partially packed. In Japanese Patent Application Laid Open No. 56-130226, a method to narrow the size of the micropores of carbon of size of more than 0.5 nm, is described wherein a concentration of hydrocarbon in vapour of less than 2%, is adsorbed on the surface of carbon and heated, thus the soot generated by the decomposition of hydrocarbon adhered to its surface and narrowed the micropores. In this treatment, hydrocarbon is necessary to have molecular size of more than 0.5 nm such as methane, ethane and styrene. This method comprises to decompose gaseous hydrocarbon and precipitate its soot in the micropores of activated carbon or to adsorb gaseous hydrocarbon in these micropores then decompose in it, consequently narrows their size with soot, thus improves the carbon molecular sieving property. In this process, it is necessary to introduce the gaseous hydrocarbon into the furnace and decompose, precipitate soot on adsorbent, so with this process it is complicated and difficult to obtain a high quality carbon molecular sieve stably. At the same time, cost of the product becomes expensive.

In Nenryokyokaishi vol. 60, No. 654, page 859-864 (1982), a method to improve the molecular sieving property of Yallourn char is described, wherein, 4-5% of exhaust liquor of sulfite pulp and coal tar pitch are added to Yallourn char then pelletized, heated to 600°-700° C. at the speed of 10° C. min$^{-1}$ in nitrogen gas and maintained for 1 hour. In this process, the hardness of the pellet is inadequate because of the exhaust liquor of sulfite pulp used as a binder, and it is difficult to maintain the molecular sieving property of the product constantly.

BRIEF SUMMARY OF INVENTION

It is an object of this invention to provide a process for manufacturing a carbon molecular sieve, which has improved selectivity especially applied to separation of gases of small molecular size, for example, separation of nitrogen gas from air. This process comprises pelletizing powder of coconut shell charcoal containing small amounts of coal tar as a binder, carbonizing, washing in mineral acid solution, then adding specified amounts of creosote distilled in a specified range of temperature or specified amounts of 2,3 dimethylnaphthalene or 2,4 xylenol or quinoline, heating at a specified temperature and time, after then, cooling in an inert gas.

DETAILED DESCRIPTION OF THE INVENTION

The inventors have investigated ways to improve the molecular sieving property of activated carbon for a long time. In this research, the following information was obtained: an aggregation of fine carbon crystallite could be grown when a coconut charcoal containing easily crystallizing carbonaceous substance, such as coal tar pitch, was heat treated at a specified temperature and time, then these crystallites grown in the micropore diminish the micropore size. According to these findings, we developed the process for manufacturing a carbon molecular sieve, (U.S. Pat. No. 4,458,022, Japanese Pat. No. 1,342,860) wherein, pelletizing coconut shell charcoal powder with coal tar pitch and/or coal tar as a binder, carbonizing at about 750°-900° C., immersing the pellets in a dilute mineral acid solution adding about 1-3% coal tar pitch or/and coal tar, heating at 950°-1000° C. for 10-60 minutes, cooling in an inert gas.

One of the most important uses of molecular sieving carbon is an adsorbent for pressure swing adsorption process, wherein the degree of character of selective adsorption is the most important factor, therefore, the carbon molecular sieve having a high selective adsorptive capacity have been desired eagerly. In general as the selective adsorption increases, the adsorption capacity of gas decreases, namely, there is a necessary trade-off between these properties.

Then, the inventors have investigated ways to overcome the difficulty, namely, the influence of the material which is added to the carbon base and the temperature of the heat treatment on the character of selective adsorption and the adsorption capacity of gas. From this research, the following information was obtained that the selective adsorptive capacity of the carbon molecular sieve is increased remarkably with the fraction of creosote in the specified range of temperature and the heat treatment of the pellet in the specified range of temperature and time, though the adsorption capacity of gas is slightly decreased.

From these findings, we achieved the present invention, that is, the process for manufacturing an improved carbon molecular sieve, which comprises, adding coal tar pitch and/or coal tar to coconut shell charcoal powder as a binder, pelletizing, carbonizing at 600°-900° C., immersing in mineral acid solution, washing, drying then penetrating the fraction of creosote distilled in the range of temperature of 140°-260° C., heating to 600°-900° C., then maintaining 10-60 minutes at that temperature, after that, cooling it in an inert gas. Furthermore instead of the fraction of creosote, 2,3 dimethyl naphthalene, 2,4 xylenol, quinoline are more suitable for this purpose.

In this specification creasote means the middle oil and the heavier fractions of coal tar in which naphthalene, anthracene, tar acids and tar bases are removed by crystalization.

In detail, in the present invention, pelletized carbon made of coconut shell charcoal is specified as a raw material, wherein, coal tar pitch and/or coal tar is added to powder of coconut shell charcoal as a binder, then pelletized and carbonized. Pellets of carbon molecular sieve carbon for separation of gases are preferred to have the uniform shape and must have the required hardness. Various kinds of wooden char can be used as raw materials such as lignite, smokeless coal, wood, coke other than coconut shell charcoal, however, these materials can not give practical hardness. On the other hand, pelletized carbon molecular sieve made of coal had adequate hardness, but lesser adsorption capacity and selectivity, when it is used as adsorbent for separation of small size gases. When the carbon molecular sieve is made of wooden raw material, the mean diameter of micropores depends on manufacturing conditions, however, it is possible that their diameters diminish to 12-15 Å under appropriate conditions.

When the molecular sieving carbon is made of coal, it is too difficult to make the mean diameter of micropore smaller than 20 Å under any conditions. However, the diameter of small molecular weight gas is usually less than 5 Å, so it is necessary to diminish the size of micropore to around this size.

In the pelletizing process, 20-30% of coal tar pitch and/or coal tar is added to the coconut shell char coal as a binder then mixing and pelletizing by conventional method. Coconut shell charcoal used as raw material is preferred to be crushed more than ones for other uses.

Then, it is necessary to dry well at 600°-900° C. and immersed in mineral acid solution to remove soluble ingredients. In this step, drying becomes inadequate under 600° C. and capacity of oxygen and nitrogen gas adsorption decreases when dried at more than 900° C.

For example, when the molecular sieving carbon is prepared except immersing and washing in 0.6N HCl, the capacity of adsorption and the character of selective adsorption are either decreased, that is, 6.0 to 5.2 ml/g, 26 to 18 respectively.

Most of ingredients removed by washing with acid solution are alkaline metal compounds contained in charcoal made of coconut shell and these same compounds prevent the growth of aggregation of fine carbon crystallites which partially pack the micropores in heat treatment, so this said step is one of the most important one in the present invention. The kind and concentration of acid is not specified, however, 0.4-0.6N HCl is preferable based on experience. The difference of adsorption speed between oxygen and nitrogen is hardly recognized immediately after washing with acid and drying of the pelletized charcoal.

Then a fraction of creosote which is distilled at the temperature of 140°-260° C. is mixed well with the above-mentioned charcoal to permit adequate penetration heated at 600°-900° C. for 10-60 minutes. The content of creosote is not specified, however, when it is decreased, gas adsorption capacity is increased, but the character of selective adsorption is decreased, and when it is increased the reverse takes place. A content of a creosote fraction of about 2-8% is generally used. Therefore, the content of the fraction of creosote is preferred to be 3-8%. It is preferable to stir sufficiently the pelletized charcoal after adding said fraction at 200°-400° C. for 20-25 minutes for the well-penetration of creosote.

Heat treatment is preferably carried out in an inert gas stream. The speed of the rising temperature is not specified, however, 10°-15° C./minute is preferable.

Before adding said fraction, the pelletized charcoal has a high gas adsorption capacity, though it is decreased steeply after addition it, but increased again by heat treatment because of decomposition and evaporaption of said fraction. When the temperature is less than 600° C., it does not obtain adequate molecular sieving character. On the other hand, the temperature is higher than 900° C., the character of selective adsorption is increased remarkably but the capacity of gas adsorption is decreased steeply, therefore it can not be applied to pressure swing adsorption process. As shown in example 4, 5 and 6, when molecular sieving carbons are prepared by adding same amounts of said fractions, heated at various temperatures in the range of 600°-900° C., the capacity of oxygen adsorption is decreased as the temperature rises, against the character of selective adsorption is increased. Though the molecular sieving carbon prepared through the heat treatment at 800° C. showed the best result in the test apparatus of pressure swing adsorption process, however, this best temperature is considered to vary with the content of said fraction and other factors. The preferable heat treatment time varys with its temperature; it is insufficient under 10 minutes while the gas adsorption capacity is decreased steeply when it exceeds 60 minutes.

An remarkable difference is recognized between the present application and the prior one (U.S. Pat. No. 4,458,022): fraction of specified range of temperature or specified compounds are used for penetrating reagent in the present application. The oxygen gas adsorption capacity and the character of selective adsorption of the carbon molecular sieve prepared by the process of the present application and the prior one are shown in Table 1.

TABLE 1

| | oxygen gas adsorption capacity (ml/g) | selectivity (S = TN$_2$/5) |
|---|---|---|
| Example 1 (Prior Application) | 6.0 | 26 |
| Example 2 (Prior Application) | 5.6 | 24 |
| Example 3 (Prior Application) | 5.6 | 27 |
| Example 1 (Present Application) | 7.0 | 35 |
| Example 4 (Present Application) | 7.0 | 28 |
| Example 5 (Present Application) | 6.6 | 38 |
| Example 6 (Present Application) | 6.0 | 40 |

In the present specification, the method of measurement of adsorption capacity and selectivity which is introduced for evaluation of the adsorbent, are as follows:

Sample of the adsorbent (about 10 g) is left in reduced pressure for desorption more than 30 minutes then oxygen or nitrogen gas of 1 atmosphere at 25° C. is introduced and the adsorption capacity is showed as volume of gas (ml/g) adsorbed in 60 seconds.

Selectivity is measured by the following procedure: at first, volume of adsorbed oxygen gas in 5 seconds, at 25° C., 1 atmosphere, is measured, then necessary time of adsorption of the same volume of nitrogen gas (expressed as TN$_2$) are measured, and the value (S=TN$_2$/5) is defined as selectivity. This value has a close relationship with capacity of adsorbent when it is used for pressure swing adsorption process.

From Table 1, the oxygen gas adsorption capacity and selectivity (character of selective adsorption) of the carbon molecular sieve prepared by the process of the present application are remarkably improved in comparsion with one prepared by our prior application, namely, these two properties are improved at the same time. This is worth noticing because there is a remarkable antinomy between these two properties of the sieve prepared by conventional procedure. Such a carbon sieve is more effective to use for pressure swing adsorption process.

The above-mentioned effect of said fraction was developed from the comparison between the effect of decomposition of said fraction in liquid or solid phase and that of hydrocarbons (benzene, toluene etc.) in vapor phase. The inventors investigated whether the character of selective adsorption is formed by precipitation of fine carbon particles or by carbonization of said fraction. These particles are caused through evaporation and decomposition of penetrated hydrocarbons in vapor phase, while the carbonization of said fraction is carried out in liquid phase or solid phase on the surface.

A molecular sieving carbon is prepared as in Example 1 except benzene is used in place of said fraction and nitrogen gas is not introduced during heat treatment. The properties of thus prepared carbon molecular sieve are as follows: the capacity of gas adsorption is 7.2 ml/g the character of selective adsorption is 28, namely, the character of selective adsorption is formed to some extent. It is supposed that benzene vapor stays around, decomposes to fine carbon particles and precipitates on the surface. On the other hand, said heat treatment is carried out in nitrogen gas stream so as to remove hydrocarbon vapor immediately after evaporation, the character of selective adsorption is as follows; the capacity of oxygen adsorption is 7.9 ml/g, the selectivity is S=1.3 (Comparative Example 4), and these properties are about as same as the carbonizing charcoal (Comparative Example 6), namely the selectivity are hardly formed. However, when creosote or/and coal tar are added in stead of benzene, a considerable selectivity is formed even heat treatment is carried out in nitrogen gas stream, as shown in Example 1, Comparative Example 2 and 3. Therefore it is obvious that the molecular sieving property is formed through decomposition of penetrated carbon compound in liquid phase or solid phase. In other words, in order to form high grade molecular sieving property on the surface, it is necessary to penetrate carbon compound which is at least partially carbonized in liquid phase or solid phase during heat treatment. While carbon compound which evaporates almost all during heat treatment, can not be used as penetrating agent.

From this standpoint, the inventors investigated the influence of fractions of coal tar on the molecular sieving property, and found that creosote was preferable—especially the fraction distilled in the temperature range of 140°–260° C. as the penetrating agent. As coal tar is sticky, the upper limit of its content must not exceed 1.5–2.5% and if it is added more than 2.5%, the property of gas adsorption is scarcely formed through heat treatment. However, when said fraction of creosote is used in stead of coal tar, even though more than 6–8% is added, the property of gas adsorption is formed to a considerable extent. It is supposed that a thin carbon layer is formed uniformly on the surface; this is why to improve the character of selective adsorption. If coal tar is used for penetrating agent, a thick carbon layer is formed ununiformly on the surface which is considered to choke micropore. The surface condition and property of carbon layer are caused by macro molecular ingredient contained in coal tar. It is necessary to make a thin and uniform carbon layer coverd on the surface and the layer chokes the micropore partially, but not completely.

Furthermore, the inventors investigated components contained in said fraction distilled in the temperature range of 140°–260° C., and found that 2,3 dimethyl naphthalene, 2,4 xylenol and quinoline were particularly effective for this purpose in the amount of about 3 to 7% of the dried pellets. At the same time, carbon compound which is decomposed and at least partially carbonized in liquid phase or solid phase, are also used for this purpose.

When such a carbon compound is penetrated into the pelletized charcoal, the relationship between the decomposed products and the character of selective adsorption formed through heat treatment, are investigated. 2 parts of said fraction is added to the carbonized pelletes prepared in Example 1, then heated gradually, in rotary kiln, to specified temperatures in the range of 80°–600° C., for 40 minutes to stop thermal decomposition at the primary stage. The Capacity of gas adsorption and the character of selective adsorption are shown in Table 2.

TABLE 2

| Temperature of heat treatment (°C.) | oxygen gas adsorption capacity (ml/g) | selectivity (S = TN$_2$/5) |
|---|---|---|
| Carbonized charcoal (raw material) | 8.0 | 1.3 |
| 80° | 2.8 | 6 |
| 120° | 3.1 | 10 |
| 300° | 3.4 | 14 |
| 400° | 4.2 | 16 |
| 500° | 6.1 | 18 |
| 600° | 6.9 | 25 |

From table 2, the carbonized charcoal has a high capacity of gas adsorption, but hardly has a character of selective adsorption. Said fraction adheres ununiformly on the surface immediately after adding and heating for a while, gradually penetrated into it. This condition of the surface corresponds to that of heat treatment at 80° C. in table 2 and the character of selective adsorption is formed a little, while the capacity of gas adsorption decreases steeply. Then the capacity of gas adsorption and the character of selective adsorption are improved at the same time in accordance with rising of heat treatment temperature, namely, when the temperature is 300°–400° C., a considerable character of selective adsorption is formed and the temperature rises to 600° C. said character attained to more high value. In this procedure, when said temperature is 300°–400° C., said fraction partially evaporats and its vapor stays around the surface, but it is hardly supposed that said vapor is decomposed to fine carbon particle and precipitated on the surface at such a low temperature. On the other hand, considering that the capacity of gas adsorption is increased as the temperature rises, the condition of the surface is changed by evaporation and decomposition and supposed to form the character of the molecular sieving. Thus, it can be infered that the character of molecular sieving is formed by the different mechanisms from precipitation of fine carbon particle caused by decomposition of hydrocarbons in vapor phase at high temperature.

For industrial uses such as pressure swing adsorption process, a more effective molecular sieving carbon is required, thus high temperature heat treatment (600°–900° C.) is adopted for this purpose. When said pelletized charcoal containing carbon compound is heat treated at such a high temperature, a considerable amounts of vapor stays around, thus fine carbon particles may precipitate on the surface, however, even if heat treatment is carried out in nitrogen gas stream at high temperature, the character of the molecular sieve is considered to be formed to high extent. This consideration is already mentioned concerning the result of forementioned example. Both the capacity of gas adsorption and the character of selective adsorption are improved at the same time by heat treatment at low temperature (Table 2). However, for industrial use, a carbon molecular sieve needs a high selectivity and hardness, so it is necessary to prepared through high temperature heat treatment. At such high temperature these two properties still show antimony only a little. However, it is clear that values of both characters are either very high grade as shown in the results of Example 4–6. Thus prepared molecular sieve satisfies well for practical use, therefore, the problem is substancially solved.

The other process for manufacturing molecular sieving carbon is known wherein hydrocarbon vapor is introduced into a carbonaceous base at high temperature, for example methane, ethane and benzene, and it easily decomposes to free fine carbon particles, then precipitates on the surface, thus the character of molecular sieving is formed. Furthermore, infering this procedure, when a molecular sieving carbon is prepared by heat treatment of the carbonaceous base containing coal tar or pitch etc., the property of molecular sieving is possible to regard to be formed by precipitation of fine carbon particles caused by decomposition in vapor phase. However, it is clear that said property is mainly formed derived from the change of condition of the surface as beforementioned.

When the molecular sieving carbon is prepared practically, the heat treatment is carried out during introduction of a small amounts of inert gas, for example, nitrogen gas, thus sometimes evaporated vapor is not removed completely and a small amounts of decomposed fine carbon particles may precipitates on the surface. However, the formation of the molecular sieving property is considered to be a little depend on said precipitation.

It is necessary to cool the carbon molecular sieve in inert gas after heat treatment. In this process, cooling temperature is preferred to be less than 300° C., when it is removed from the furnace and contacted with air at a temperature higher than 300° C., adsorption capacity of oxygen remarkably decreases.

In the present invention, the carbonized pellet prepared by adding coal tar or pitch to charcoal powder as a binder and carbonized, scarcely has the character of selective adsorption. However, the character of excellent selective adsorption is formed through immersing in dilute acid solution, adding specified fraction and heat treatment. In this procedure, the development of said specified fraction bears a very important role. Thus, both the capacity of gas adsorption and the character of selective adsorption are improved either to very high grade.

Thus prepared carbon molecular sieve by the present invention is applied preferable for the separation of nitrogen and oxygen gas by pressure swing adsorption process, at the same time, it is available for separation of gases of which size of molecule is less than 5 Å by the same process, based on difference of the size.

In the present specification, the method of measurement of adsorption capacity and the selectivity which is introduced for evaluation of the adsorbent, are described before. Furthermore, the evaluation with a small size pressure swing adsorption apparatus is carried out for the practical use.

adsorption column; 2 set, each set 1.05 l (packed molecular sieving carbon
adsorption pressure; 6.5 Kg/cm$^2$ (G), 25° C.
desorption pressure; 760 mmHg
adsorption time, desorption time; each 2 minutes
SV (Space velocity); 2.0, 1.5 minute$^{-1}$.

SV means the value that volume of the separated nitrogen gas at standard condition is divided by volume of the molecular sieving carbon packed in one adsorption column. However, experimental results obtained with said apparatus fluctuates to some extent, so as a rule, the property of molecular sieving is evaluated by the capacity of gas adsorption and the selectivity and the result of said apparatus is considered as reference.

To further illustrate present invention, and not by way of limitation, the following examples are given.

EXAMPLE 1

35 parts of coal tar and 5 parts of water are added to 100 parts of well crushed coconut shell charcoal, mixed well in a kneader, then molded into pellets having a diameter of 2 mm.

Then the pellets are carbonized by heating up to 700° C. for 40 minutes in a fluidized bed furnace, further heating in an electric furnace at 900° C., carbonized pellets are diped in 0.6N HCl, washed adequately with water and dryed, then 5 parts of a fraction of creosote at 140°–260° C. is added and penetrated well into dryed pellets by mixing in a rotary kiln and heating up to 400° C. for 20 minutes while introducing a small amounts of nitrogen gas, then heated up to 700° C. for 20 minutes, cooled to room temperature in nitrogen gas, thus prepared the carbon molecular sieve.

Furthermore, 2 kinds of carbon molecular sieves are prepared as same as Example 1, except amounts of said fraction are added 8 and 12 parts respectively.

Properties of carbon molecular sieves are shown in Table 3.

TABLE 3

| | Fraction of creosote (Part) | Oxygen gas adsorption Capacity (ml/g) | selectivity (S = TN$_2$/5) | PSA* SV = 2 (O$_2$ %) | SV = 1.5 (O$_2$ %) |
|---|---|---|---|---|---|
| Example 1 | 5 | 7.0 | 35 | 1.00 | 0.50 |
| Example 2 | 8 | 5.9 | 38 | 1.30 | 0.77 |
| Example 3 | 12 | 4.0 | 50 | 3.80 | 2.5 |

*Evaluation with the small size pressure swing adsorption apparatus.

EXAMPLE 4–6

Comparative Example 1

3 kinds of carbon molecular sieve are prepared as same as Example 1, except conditions of heat treatment after adding said fraction.

Conditions of heat treatment and properties of carbon molecular sieve are shown in Table 4.

TABLE 4

| | heat treatment temperature (°C.) | time (minute) | Oxygen gas Adsorptions Capacity (ml/g) | selectivity (S = TN$_2$/5) | PSA SV = 2 (O$_2$ %) | SV = 1.5 (O$_2$ %) |
|---|---|---|---|---|---|---|
| Example 4 | 400°–600° | 20' | 7.0 | 28 | 1.5 | 0.77 |
| Example 5 | 400°–800° | 30' | 6.6 | 38 | 1.35 | 0.70 |
| Example 6 | 400°–900° | 35' | 6.0 | 40 | 1.70 | 0.90 |
| Comparative Example 1 | 400°–1000° | 40' | 5.2 | 45 | 2.9 | 1.90 |

EXAMPLE 7–8 and Comparative Example 2–3

Carbon molecular sieve are prepared as same as Example 1, except other fraction of creosote are added instead of said distillate.

Properties of carbon molecular sieve are shown in Table 5.

TABLE 5

| | Fraction | Oxygen gas Adsorption Capacity (ml/g) | selectivity (S = TN$_2$/5) | PSA SV = 2 (O$_2$ %) | SV = 1.5 (O$_2$ %) |
|---|---|---|---|---|---|
| Example 7 | creosote residue (>300° C.) 3 parts | 6.4 | 30 | 1.80 | 1.00 |
| Example 8 | creosote 4 parts | 6.6 | 32 | 1.41 | 0.74 |
| Comparative Example 2 | coal tar 2 parts | 6.2 | 28 | 1.95 | 1.20 |
| Example 3 | coal tar 1.6 parts | 6.0 | 26 | 2.20 | 1.45 |

EXAMPLE 9–11 and Comparative Example 4–6

Carbon molecular sieve are prepared as same as Example 1, except specified compounds are added instead of said creosote fraction.

Properties of carbon molecular sieve are shown in Table 6.

TABLE 6

| | carbon compound | Oxygen gas adsorption capacity (ml/g) | selectivity (S = TN$_2$/5) | PSA SV = 2 (O$_2$ %) | SV = 1.5 (O$_2$ %) |
|---|---|---|---|---|---|
| Example 9 | 2,3dimethyl naphthalene: 7 parts | 6.9 | 34 | 1.16 | 0.61 |
| Example 10 | 2,4xylenol: 6 parts | 6.8 | 35 | 1.10 | 0.58 |
| Example 11 | quinoline: 3 parts | 6.5 | 30 | 1.70 | 0.90 |
| Comparative Example 4 | benzen 5 parts | 7.9 | 1.3 | | |
| Example 5 | xylene 5 parts | 7.7 | 2.5 | | |

TABLE 6-continued

| | carbon compound | Oxygen gas adsorption capacity (ml/g) | selectivity (S = TN$_2$/5) | PSA SV = 2 (O$_2$ %) | PSA SV = 1.5 (O$_2$ %) |
| --- | --- | --- | --- | --- | --- |
| Example 6 | non | 8.0 | 1.3 | | |

What is claimed as new and is intended to be secured by Letters Patent is:

1. A process for manufacturing a carbon molecular sieve having both increased gas adsorption capacity and selectivity; comprising:
    (a) adding coal tar, coal tar pitch or a combination thereof to powdered coconut shell charcoal as a binder;
    (b) pelletizing said mixture and carbonizing the same at about 600°–900° C.;
    (c) immersing the pellets in mineral acid solution, thereby substantially removing soluble ingredients comprising alkaline metal compounds therefrom;
    (d) drying the immersed pellets;
    (e) adding to the dried pellets a fraction of cresote which is distilled at a temperature of 140°–260° C., in an amount sufficient to increase both said gas adsorption capacity and selectivity;
    (f) heating the pellets to about 600°–900° C., for about 10–60 minutes; and
    (g) cooling the pellets in an inert gas.

2. The process for manufacturing a carbon molecular sieve according to claim 1, wherein the amount of the fraction of cresote is 2–8% of the dried pellets.

3. The process for manufacturing a carbon molecular sieve according to claim 1, wherein about 20–30% of coal tar or coal tar pitch or a combination thereof is added to the powdered coconut shell charcoal.

4. The process for manufacturing a carbon molecular sieve according to claim 1, wherein said mineral acid solution is about 0.4–0.6N HCl.

5. The process for manufacturing a carbon molecular sieve according to claim 2, wherein the amount of the creosote fraction is 3–8% of the dried pellets.

6. The process for manufacturing a carbon molecular sieve according to claim 1, which further comprises, after adding creosote to the dried pellets stirring said creosote and said pellets at a temperature of 200°–400° C. for about 20–25 minutes.

7. The process for manufacturing a carbon molecular sieve according to claim 1, wherein the heating of said pellets after adding creosote thereto is effected such that the temperature is increased at a rate of about 10°–15° C./minute.

8. A process for manufacturing a carbon molecular sieve having both increased gas adsorption capacity and selectivity, comprising:
    (a) adding coal tar, coal tar pitch, or a combination thereof to powdered coconut shell charcoal as a binder;
    (b) pelletizing said mixture and carbonizing the same at about 600°–900° C.;
    (c) immersing in the pellets in mineral acid solution, thereby substantially removing soluble ingredients comprising alkaline metal compounds therefrom;
    (d) drying the immersed pellets;
    (e) adding to the dried pellets 2,3-dimethyl naphthalene or 2,4-xylenol or quinoline, in an amount sufficient to increase both said gas adsorption capacity and selectivity;
    (f) heating the pellets to about 600°–900° C., for about 10–60 minutes; and
    (g) cooling the pellets in an inert gas.

9. The process for manufacturing a carbon molecular sieve according to claim 8, wherein the amount of 2,3-dimethyl naphthalene or 2,4-xylenol or quinoline is 3–7% of the dried pellets.

* * * * *